April 28, 1936. B. H. ADLER 2,038,978
CHANGEABLE SIGN AND LETTERS THEREFOR
Filed June 24, 1935 2 Sheets-Sheet 1
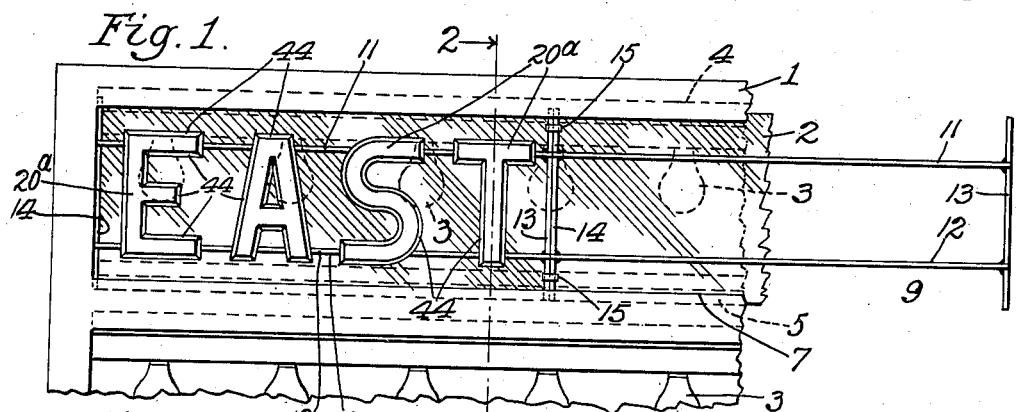
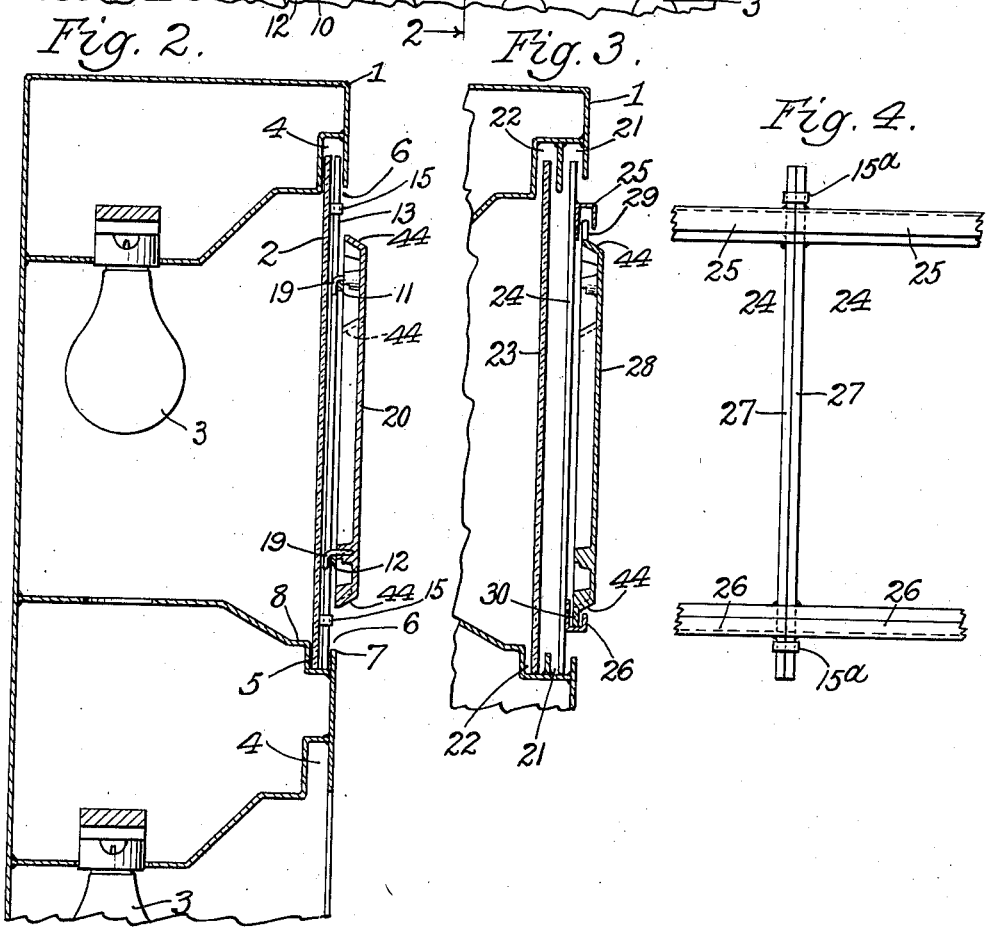
Inventor
Benjamin H. Adler
by Parker & Carter
Attorneys.

April 28, 1936.  B. H. ADLER  2,038,978
CHANGEABLE SIGN AND LETTERS THEREFOR
Filed June 24, 1935  2 Sheets-Sheet 2
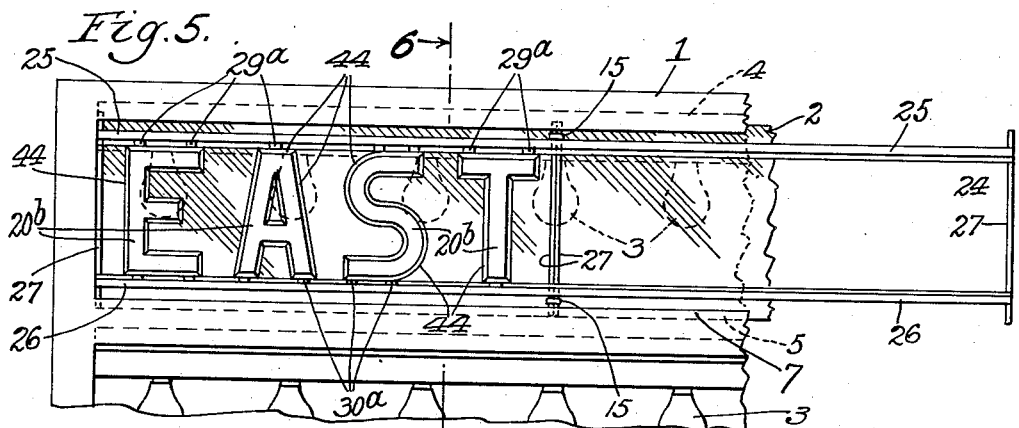
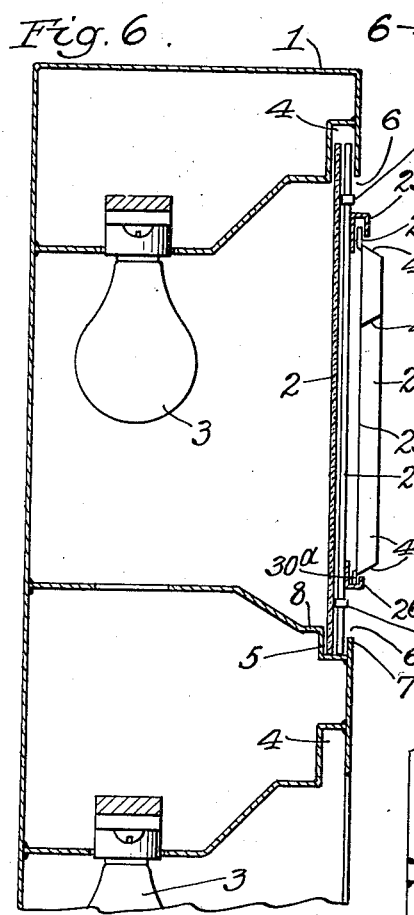
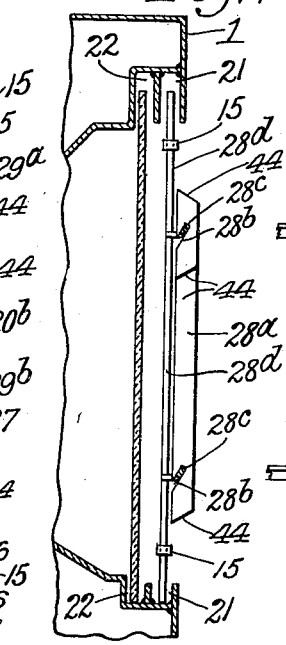
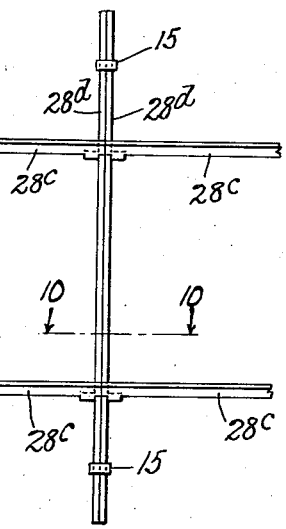
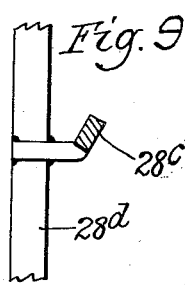
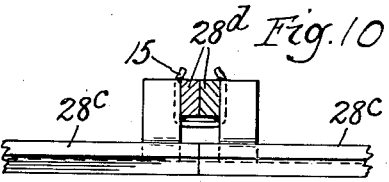
Inventor
Benjamin H. Adler
by Parker & Carter
Attorneys.

Patented Apr. 28, 1936

2,038,978

UNITED STATES PATENT OFFICE 2,038,978

CHANGEABLE SIGN AND LETTERS THEREFOR

Benjamin H. Adler, Chicago, Ill.

Application June 24, 1935, Serial No. 28,140

7 Claims. (Cl. 40—133)

This invention relates to changeable signs and letters therefor, and has for its object to provide a new and improved device of this description.

The invention has as a further object to provide a changeable sign made up of letters and arranged so that the letters may be easily and quickly removed, and replaced by other letters to change the reading of the sign.

The invention has as a further object to provide new and improved letters for such signs.

The invention has as a further object to provide letters for signs arranged so that they will be spaced apart, with lights back of them to form silhouetted letters, the letters being arranged so that there will be a light effect surrounding both the external and the internal edges of the letters.

The invention has other objects which will be more particularly pointed out in the accompanying description.

Referring now to the drawings, Fig. 1 is a view with parts broken away of one form of device embodying the invention;

Fig. 2 is an enlarged sectional view taken on line 2—2 of Fig. 1;

Fig. 3 is a view similar to Fig. 2, with parts broken away, showing a modified construction;

Fig. 4 is an enlarged view of the letter supporting device illustrated in Fig. 3, for supporting the letters;

Fig. 5 is a view of a sign with parts broken away, showing a modified construction;

Fig. 6 is a sectional view taken on line 19—19 of Fig. 5;

Fig. 7 is a view similar to Fig. 6, with parts broken away, showing a modified construction;

Fig. 8 is a view showing the letter supporting device of Fig. 7;

Fig. 9 is an enlarged sectional view showing the supporting member on the frame work shown in Figs. 7 and 8; and Fig. 10 is an enlarged sectional view taken on line 23—23 of Fig. 8.

Like numerals refer to like parts throughout the several figures.

Referring to the construction shown in Figs. 1 and 2, there is illustrated a sign which may be any sign for advertising purposes or the like for theatres, stores, or other places. This sign consists of a suitable frame 1, in which is mounted the glass 2. Suitable lights 3 are placed back of the glass so as to direct light through the glass and past the letters in front thereof. The frame 1 is provided with suitable channels, the top and bottom 4 and 5, in which the glass 2 is placed. The frame is open in the front 6 and the glass is placed in position by placing one edge, say the upper edge, in the channel 4 and then lifting the glass up, the channel being of sufficient depth for this purpose, until the lower edge passes the lower edge 7 of the frame and is then lowered into the channel 5.

The channel 5 has at the back a part 8 which prevents the glass from being moved too far and thus being misplaced by the party placing it in position. There is also provided a letter supporting device which is preferably made in sections, two sections 9 and 10 being shown. Each section has the horizontal members 11 and 12 and the vertical members 13 and 14. The vertical members project beyond the horizontal members in both directions and their ends are received in the channels 4 and 5, as shown in Figs. 1 and 2. Adjacent sections are fastened together in any desired manner, as by means of the clamps 15.

The letter supporting device illustrated in Figs. 1 and 2 are particularly adapted for a form of letter having rearwardly projecting engaging devices or hooks thereon. One form of this letter is illustrated in Figs. 5 and 6, wherein the letters are hollowed out at 16 and there are projections 17 at the top and 18 at the bottom of the letter, the number of projections depending upon the letter. The letter E, for example, would preferably have four and the letter I might have four or two. These letters may be cast, molded, formed or shaped out of any material whatsoever and there are cast in the projections 17 and 18 the supporting members or hooks 19. These members are preferably deformed in some manner so that they cannot be easily pulled out when cast in the metal. I have illustrated one form of this construction where the holding members are recessed at 20. In placing these letters in position, the letter 20a is placed with the bent ends of the supporting member 19 just above the horizontal members 12 of the letter supporting device, and the letter is pushed in and lowered until the supporting members engage the horizontal members 11 and 12, as shown in Fig. 2.

There is illustrated in Fig. 3 a modified construction wherein the frame 1 is provided, both at the top and bottom, with two channels 21, 22. The glass 23 is placed in one of the channels and the letter supporting device 24 is placed in the other channel, as shown in Fig. 3. In this construction the letter supporting device, instead of having the two simple cross members, has the channels 25 and 26 for cross members, the upper channels opening downward and the lower channels opening upward. These channels are connected together by the vertical member 27. The adjacent vertical members of the adjacent sections of the device are connected together by the clamps 15a, as shown in Fig. 4. In this construction the letters 28 have projections 29 and 30 on the upper and lower edges. In placing the letters in position, the projection 29 is placed in the channel 25 and the letter then lifted, and the lower projection 30 placed in the channel 26, as shown in Fig. 3. These letters and this letter supporting device may of course be used in the frame with the single channel, as shown in Fig. 2.

It will be noted that all of these letters are made up when first manufactured so that by a little change they can be used on either of the forms of letter supporting devices shown in Figs. 1 and 2 or 3 and 4.

In the letters illustrated in Figs. 1 to 10, inclusive, the letters are provided on their outside edges, and the edges of the spaces through them, with beveled or inclined faces 44. These beveled or inclined faces are formed with light reflecting surfaces preferably by being colored a light color so that when the light shines from behind, the letters will be silhouetted against the glass and there will be a light boundary entirely around the letters and along the boundary of the open spaces in the letters, this light boundary having a width depending upon the size of the beveled faces 44.

In Figs. 5 and 6 there is shown a modified construction of a letter to be used in connection with the frame and letter supporting device arrangement shown in Figs. 1 and 2. In this construction the letter 20b has the projections 29a—30a in a plane beyond the inner edge 29b of the letter, see Fig. 6. These letters may also have the projections 17 and the supporting devices 19. When the projections 29a are used the supporting device 19 may be removed, and when the supporting device 19 is used, the projections 29a may be removed. Since these projections are beyond the inner edge of the beveled face 44 of the letter, their removal does not effect this beveled face.

It will be noted that these letters may be made up and then changed as desired, depending upon the letter supporting device used and they can then be easily and quickly placed in position or removed, and that the device is arranged so that the party placing them in position, who is in a more or less awkward position upon a ladder, cannot move them past the supporting device so as to get them out of position, or cause them to drop, or be misplaced.

I have described in detail certain particular constructions embodying the invention, but it is of course evident that the parts may be varied in many particulars and other parts omitted, and the device herein shown used with parts other than those illustrated without departing from the spirit of the invention as embodied in the claims hereto attached, and I therefore do not limit myself to the particular construction shown.

I claim:

1. A changeable sign comprising a frame, a glass, means for holding said glass in said frame, a light behind said glass, a letter supporting device having cross members and upright members, the upright members connecting with said frame, said letter supporting device being separate from said glass and adapted to be put in position or removed while the glass is in place and a series of separated letters having engaging parts which releasably engage said letter supporting device.

2. A changeable sign comprising a frame, a glass, a series of separated letters having flat-faced beveled light reflecting edges which extend to the outmost edges of the letters and which form light reflecting surfaces around the letters, a series of lights back of said glass, said letters so spaced that the light from behind can pass between them so as to strike said beveled edges, said beveled edges reflecting the light behind the glass, outwardly at night whereby the letters are easily read when viewed at an angle or from a distance.

3. A changeable sign comprising a frame, a glass therein, a light behind said glass, said frame provided with upper and lower channels, a letter supporting device having cross members and upright members projecting beyond the cross members, the upright members being received in said channels, and letters removably connected with said cross members.

4. A changeable sign comprising a frame, a glass therein, a light behind said glass, said frame provided with upper and lower channels, a letter supporting device having cross members and upright members projecting beyond the cross members, the upright members being received in said channels, and letters connected with said cross members, the connections to the letters being intermediate their upper and lower edges.

5. A changeable sign comprising a frame, a glass therein, a light behind said glass, said frame provided with upper and lower channels, a letter supporting device having cross members and upright members projecting beyond the cross members, the upright members being received in said channels, and letters removably connected with said cross members, said letters having supporting members projecting from the backs thereof which engage said cross members to hold the letters in position.

6. A changeable sign comprising a frame, a glass therein, a light behind said glass, said frame provided with upper and lower channels, a letter supporting device having cross members and upright members projecting beyond the cross members, the upright members being received in said channels, and letters removably connected with said cross members, the cross members of the letter supporting device being channels, the letters having projections which fit into said channels.

7. A changeable sign comprising a frame, a glass therein, a light behind said glass, said frame provided with upper and lower channels, a letter supporting device having cross members and upright members projecting beyond the cross members, the upright members being received in said channels, and letters removably connected with said cross members, the cross members of the letter supporting device being channels, the letters having projections which fit into said channels, the letters having beveled edges and the projections being in a plane beyond the innermost part of the beveled edges.

BENJAMIN H. ADLER.

DISCLAIMER 2,038,978.—*Benjamin H. Adler*, Chicago, Ill. CHANGEABLE SIGN AND LETTERS THEREFOR. Patent dated April 28, 1936. Disclaimer filed August 9, 1940, by the assignee, *Ben Adler Signs, Inc.*

Hereby enters this disclaimer to claims 3, 4, and 5.

[*Official Gazette September 3, 1940.*]